(12) United States Patent
Liu (10) Patent No.: US 11,777,396 B2
(45) Date of Patent: Oct. 3, 2023

(54) DUAL CONVERTER BASED SINGLE-STAGE BATTERY CHARGING SYSTEM AND CONTROL METHOD

(71) Applicant: Halo Microelectronics International, Campbell, CA (US)

(72) Inventor: Rui Liu, Freemont, CA (US)

(73) Assignee: Halo Microelectronics International, Campbell, CA (US)

( * ) Notice: Subject to any disclaimer, the term of this patent is extended or adjusted under 35 U.S.C. 154(b) by 242 days.

(21) Appl. No.: 17/382,738

(22) Filed: Jul. 22, 2021

(65) Prior Publication Data

US 2023/0026736 A1 Jan. 26, 2023

(51) Int. Cl.
*H02M 3/07* (2006.01)
*H02J 50/12* (2016.01)
*H02M 1/00* (2006.01)
*H02M 3/158* (2006.01)

(52) U.S. Cl.
CPC .......... *H02M 1/0095* (2021.05); *H02J 50/12* (2016.02); *H02M 3/07* (2013.01); *H02M 3/1582* (2013.01); *H02J 2207/20* (2020.01)

(58) Field of Classification Search
CPC . H02M 3/07–073; H02M 1/0095; H02J 50/12
See application file for complete search history.

(56) References Cited

U.S. PATENT DOCUMENTS

| | | | | |
|---|---|---|---|---|
| 11,451,151 B1 * | 9/2022 | Liu | .......... | H02M 3/07 |
| 11,476,691 B2 * | 10/2022 | Liu | .......... | H02J 7/345 |
| 11,509,146 B1 * | 11/2022 | Zhang | .......... | H02J 7/00714 |
| 11,522,466 B1 * | 12/2022 | Li | .......... | H02M 7/4837 |
| 11,539,296 B2 * | 12/2022 | Liu | .......... | H02M 3/1584 |
| 2009/0033293 A1 * | 2/2009 | Xing | .......... | H02M 3/1588 323/284 |
| 2018/0060712 A1 * | 3/2018 | Liu | .......... | G06K 7/084 |
| 2020/0036286 A1 * | 1/2020 | Giuliano | .......... | H02M 1/42 |
| 2022/0149644 A1 * | 5/2022 | Liu | .......... | H02J 7/0068 |
| 2023/0013025 A1 * | 1/2023 | Kumar | .......... | H02M 1/007 |
| 2023/0026736 A1 * | 1/2023 | Liu | .......... | H02J 50/12 |
| 2023/0047446 A1 * | 2/2023 | Liu | .......... | H02M 1/007 |
| 2023/0089638 A1 * | 3/2023 | Liu | .......... | H02M 3/072 320/106 |
| 2023/0089910 A1 * | 3/2023 | Duncan | .......... | H02M 3/158 323/283 |

FOREIGN PATENT DOCUMENTS

| | | | | | |
|---|---|---|---|---|---|
| CN | 112019052 | A | * | 12/2020 | .............. H02J 7/007 |
| CN | 113595215 | A | * | 11/2021 | |
| CN | 113746178 | A | * | 12/2021 | ........ H02J 7/007184 |
| CN | 113824196 | A | * | 12/2021 | |
| CN | 113572242 | B | * | 1/2022 | |
| CN | 114552975 | A | * | 5/2022 | |
| KR | 102507050 | B1 | * | 3/2023 | |

* cited by examiner

*Primary Examiner* — Sisay G Tiku (74) *Attorney, Agent, or Firm* — AP3 Law Firm PLLC (57) ABSTRACT

A single-stage battery charging system includes a hybrid converter comprising a plurality of first power switches connected in series, an inductor and a first flying capacitor, wherein the inductor is connected to a midpoint of the plurality of first power switches, a switched capacitor converter comprising a plurality of second power switches connected in series, and a second flying capacitor, and an isolation switch coupled between the midpoint of the plurality of first power switches and a midpoint of the plurality of second power switches.

26 Claims, 6 Drawing Sheets

DUAL CONVERTER BASED SINGLE-STAGE BATTERY CHARGING SYSTEM AND CONTROL METHOD

TECHNICAL FIELD

The present invention relates to a battery charging system, and, in particular embodiments, to a single-stage battery charging system.

BACKGROUND

As technologies further advance, a variety of portable devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the plurality of rechargeable battery cells. The battery charger is controlled to provide voltage (e.g., a constant voltage charging mode) and current (e.g., a constant current charging mode) to the plurality of rechargeable battery cells so as to restore energy to the battery.

As power consumption has become more important, there may be a need for reducing the length of time to charge the battery. Fast charging has emerged as a veritable solution to satisfy the ever-changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

Modern smartphones often require large capacity batteries to achieve the desired operation time between battery charges. Recent developments in battery fast charging technologies have encountered challenges to reduce the excessive power dissipation resulting from the large input current when directly charging a single cell battery. The large input current also requires customized USB connectors, thereby adding additional system costs. A dual-cell battery includes two battery cells connected in series. The dual-cell battery helps to resolve the large input current issue due to its doubled battery voltage at the same capacity. The reduced current consequently reduces the power dissipation associated with the large input current, thereby enabling the use of standard USB connectors. However, a buck-boost type switching charger is needed to convert the output voltage (e.g., 5 V) of the standard USB to a desired battery charging voltage, which is normally in a range from 5 V to 9 V for a cascaded dual-cell battery.

Figure 1:
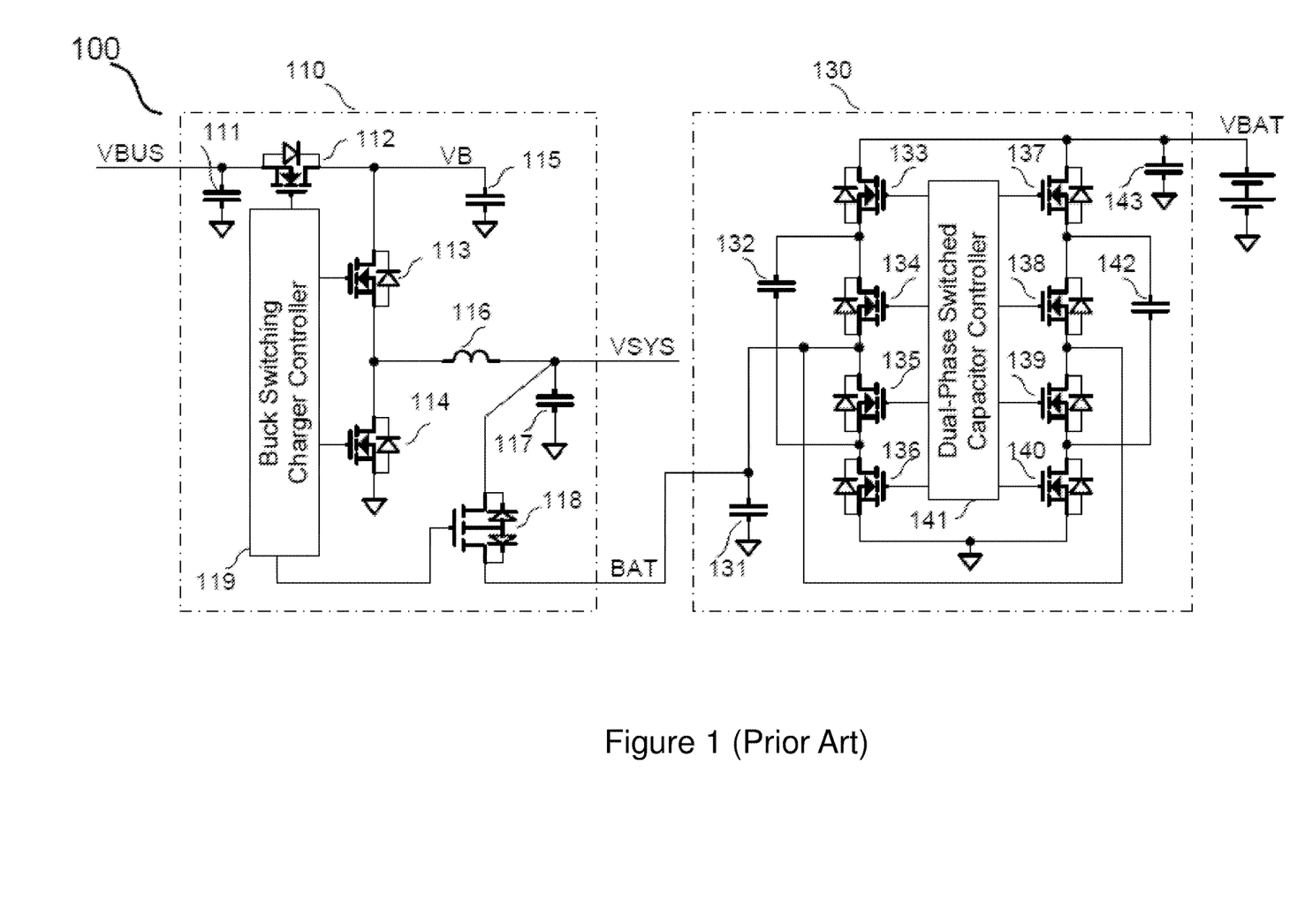
FIG. 1 illustrates a dual-cell battery charging system.

FIG. 1 illustrates a dual-cell battery charging system. The dual-cell battery charging system comprises two power converters connected in cascade between a first voltage bus VBUS and a second voltage bus VBAT. A first power converter 110 is a buck switching converter. A second power converter 130 is a switched capacitor converter. As shown in FIG. 1, the switched capacitor converter 130 is implemented as a dual-phase switched capacitor converter. A first phase includes switches 133, 134, 135 and 136 connected in series between the second voltage bus VBAT and ground. A first flying capacitor 132 is connected between a common node of switches 133 and 134, and a common node of switches 135 and 136. A common node of the switches 134 and 135 is connected to a third voltage bus BAT. A second phase includes switches 137, 138, 139 and 140 connected in series between the second voltage bus VBAT and ground. A second flying capacitor 142 is connected between a common node of switches 137 and 138, and a common node of switches 139 and 140. A common node of the switches 138 and 139 is connected to the third voltage bus BAT. As shown in FIG. 1, a capacitor 131 is connected between the third voltage bus BAT and ground.

A dual-phase switched capacitor controller 141 is configured to generate gate drive signals for driving switches 133-140. A capacitor 143 is coupled between the second voltage bus VBAT and ground.

The first power converter 110 is implemented as a step-down power converter. The first power converter 110 includes switches 113 and 114 connected in series between an input voltage bus VB and ground. An inductor 116 is connected between a common node of switches 113 and 114, and a system voltage bus VSYS. An output capacitor 117 is connected between the system voltage bus VSYS and ground. A buck switching charger controller 119 is configured to generate gate drive signals for driving switches 113 and 114.

An input capacitor 115 is coupled between the input voltage bus VB and ground. The input voltage bus VB is coupled to another input voltage bus VBUS through a switch 112. The switch 112 is also controlled by the buck switching charger controller 119. The switch 112 is employed to connect the first power converter 110 to the voltage bus VBUS or disconnect the first power converter 110 from the input voltage bus VBUS. In addition, the switch 112 is able to provide a current limiting protection.

The third voltage bus BAT is coupled to the system voltage bus VSYS through a switch 118. The switch 118 is implemented as an isolation switch. In particular, the switch 118 provides isolation between the third voltage bus BAT and the system voltage bus VSYS. As shown in FIG. 1, the bulk terminal of the switch 118 is not connected to the source of the switch 118. The switch 118 includes two diodes. A first diode is between the bulk terminal and the source. A second diode is between the bulk terminal and the drain. These two diodes are back-to-back connected. As a result of having the back-to-back connected diodes, the switch 118 functions as the isolation switch. The buck switching charger controller 119 is configured to generate a gate drive signal for driving the switch 118. The switch 118 is employed to connect the third voltage bus BAT to the first power converter 110 or disconnect the third voltage bus BAT from the first power converter 110.

In operation, when a 5-V power source is provided at the first voltage bus VBUS, the dual-phase switched capacitor converter 130 operates in a 1:2 charge pump mode. The input of the dual-phase switched capacitor converter 130 receives power from the third voltage bus BAT to charge a dual-cell battery coupled to the second voltage bus VBAT. The third voltage bus BAT is the output of the buck switching converter 110. The desired dual-cell charging voltage is achieved by regulating the output (VSYS and BAT) of the buck switching converter 110, and then the voltage on BAT is doubled by the dual-phase switched capacitor converter 130. This power delivery path is applicable to both the constant current mode (CCM) and the constant voltage mode (CVM). Pre-charging is achieved through configuring the switch 118 to operate in a constant current mode and regulating VSYS to a voltage level equal to the minimum system voltage.

In operation, when there is no voltage present at the first voltage bus VBUS, the dual-phase switched capacitor converter 130 operates in a 2:1 charge pump mode to discharge the battery so as to maintain the system supply (VSYS) through turning on the switch 118. While eliminating the need of the expensive buck-boost switching charger, there are some inherent drawbacks of the architecture shown in FIG. 1. First, in both the battery charging mode and the battery discharging mode, the switch 118 is employed to handle both the charging and discharging currents. The current flowing through the switch 118 is high (e.g., 4 A or higher). Such a large current may cause large power losses if the on resistance of the switch 118 is not small enough. Especially during the discharging process, it is important to reduce unnecessary power losses so as to extend the battery operating time. Second, there are many power switches in the battery charging path. The battery charging path includes five switches connected in series. The five switches connected in series may cause low efficiency in the charging process. This low efficiency is undesired in the fast charging because the power losses can heat up the smartphone system, resulting in a longer charging time. Third, there are many external filtering capacitors (seven filtering capacitors) and power switches (twelve power switches) as shown in FIG. 1.

Figure 2:
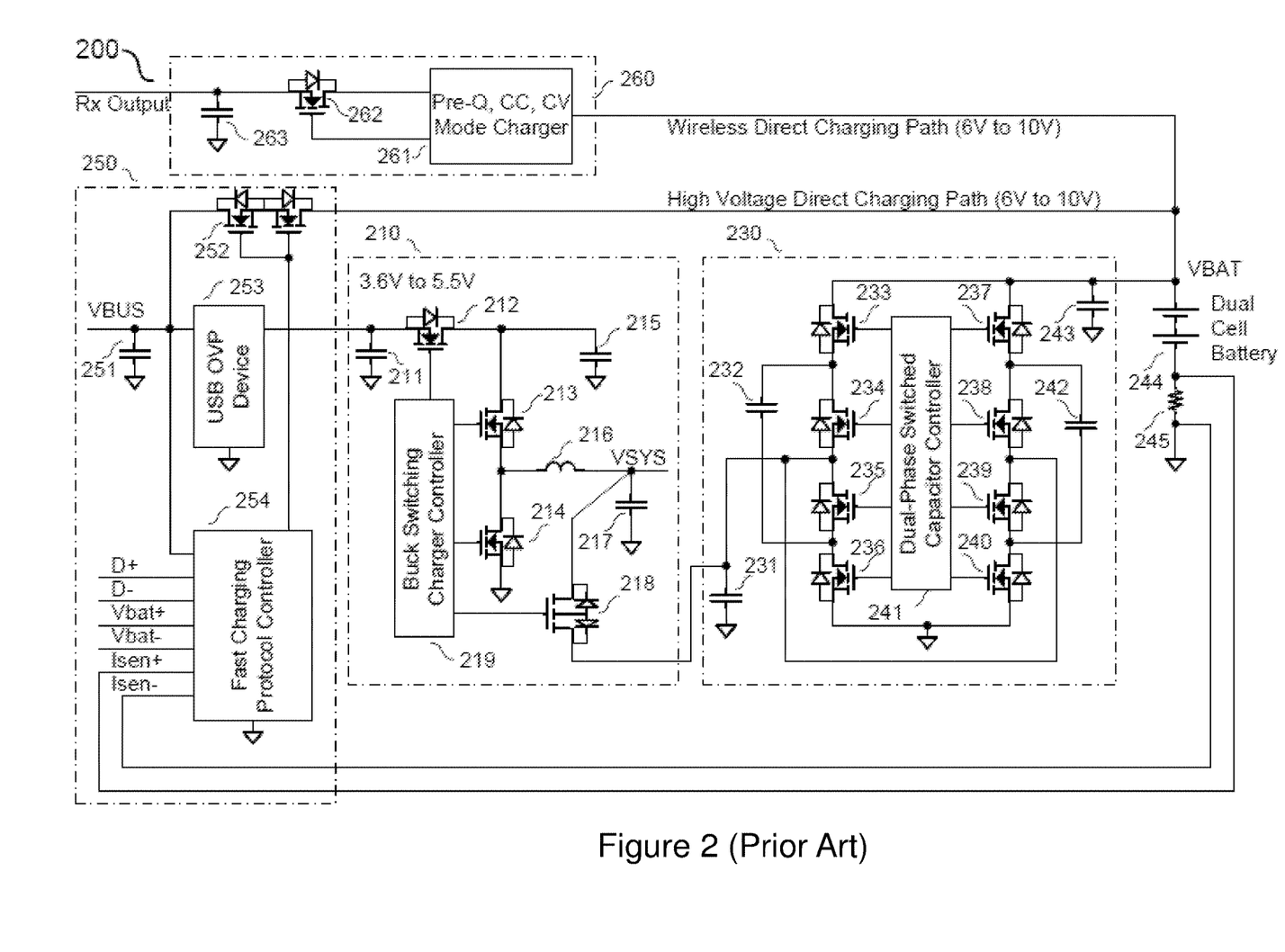
FIG. 2 illustrates a system diagram of the battery charging system shown in FIG. 1.

FIG. 2 illustrates a system diagram of the battery charging system shown in FIG. 1. The buck switching converter 210 is similar to the buck switching converter 110 shown in FIG. 1. As shown in FIG. 2, the buck switching converter 210 comprises an input capacitor 211, a switch 212, a capacitor 215, switches 213, 214, an inductor 216, an output capacitor 217, an isolation switch 218, and a buck switching charger controller 219.

The dual-phase switched capacitor converter 230 is similar to the dual-phase switched capacitor converter 130 shown in FIG. 1. As shown in FIG. 2, the dual-phase switched capacitor converter 230 comprises capacitors 231, 232, 242, 243, switches 233, 234, 235, 236, 237, 238, 239, 240 and a dual-phase switched capacitor controller 241.

The battery charging system 200 further includes a wireless direct charging path and a high voltage direct charging path. The wireless direct charging path is from a receiver (Rx) of a wireless power transfer system. As shown in FIG. 2, the output of Rx is connected to VBAT through a charger 260. The charger 260 includes an input capacitor 263, a switch 262 and a linear charger 261. The switch 262 is able to prevent reverse current. In addition, the switch 262 provides a current limit protection. The linear charger 261 is able to provide power for various operating modes including a pre-charge mode, a constant current mode and a constant voltage mode. The output voltage of the wireless direct charging path is a range from about 6 V to about 10 V. The high voltage direct charging path is from a high voltage USB direct charging adaptor. The output voltage of the high voltage direct charging path is a range from about 6 V to about 10 V.

The battery charging system 200 is able to handle the following four charging cases. In a first charging case, a standard 5-V USB adaptor is connected to the input (VBUS) of the battery charging system 200. In a second charging case, the battery charging system 200 is configured to be connected with a low voltage (e.g., from 3.6 V to 5.5 V) USB direct charging adaptor. In a third charging case, the battery charging system 200 is configured to be connected with a high voltage (e.g., from 6 V to 10 V) USB direct charging adaptor. In a fourth charging case, the battery charging system 200 is configured to be connected with a wireless charging input (e.g., a wireless power transfer system). In the fourth charging case, the linear charger 261 is needed. The linear charger 261 is coupled between the output of the wireless receiver and the dual-cell battery 244 to handle wireless fast charging. In all four charging cases, the battery charging system 200 is able to convert the input voltage into a suitable voltage for charging the battery coupled to the battery charging system 200.

The battery charging system 200 further includes a fast charging protocol controller 254. The fast charging protocol controller 254 is configured to detect the current flowing through the dual-cell battery 244 through measuring the voltage across a current sense resistor 245. The fast charging protocol controller 254 also detects the voltages (Vbat+ and Vbat−) across the dual-cell battery 244. Through two communication terminals (D+ and D−), the fast charging protocol controller 254 is able to hand-shake with different direct charging USB adaptors to enable the on/off of the appropriate back-to-back power switches (e.g., switches 252, 253 and 262) to minimize the associated charging power losses.

As power consumption has become more important, there may be a need for simplifying the battery charging systems shown in FIGS. 1-2. More particularly, the battery charging systems including two power stages (e.g., chargers 110 and 130 shown in FIG. 1, and chargers 210 and 230 shown in FIG. 2). The dual-stage charging system is not cost-effective. It is desirable to have a single-stage charging system to perform the functions of the dual-stage charging system described above with respect to FIGS. 1-2.

SUMMARY

These and other problems are generally solved or circumvented, and technical advantages are generally achieved, by preferred embodiments of the present disclosure which provide a single-stage battery charging system.

In accordance with an embodiment, a single-stage battery charging system comprises a hybrid converter comprising a plurality of first power switches connected in series, an inductor and a first flying capacitor, wherein the inductor is connected to a midpoint of the plurality of first power switches, a switched capacitor converter comprising a plurality of second power switches connected in series, and a second flying capacitor, and an isolation switch coupled between the midpoint of the plurality of first power switches and a midpoint of the plurality of second power switches.

In accordance with another embodiment, a method comprises configuring a single-stage battery charging system to provide power for a battery and a plurality of system loads coupled to a system voltage bus, the single-stage battery charging system comprising a hybrid converter, a switched capacitor converter and an isolation switch, configuring the hybrid converter as a three-level boost converter in response to a first operating mode, configuring the hybrid converter as a three-level buck converter in response to a second operating mode, configuring the hybrid converter, the switched capacitor converter and the isolation switch to form a dual-phase switched capacitor converter operating in a 2:1 charge pump mode in response to a third operating mode, and configuring the hybrid converter, the switched capacitor converter and the isolation switch to form the dual-phase switched capacitor converter operating in a 1:2 charge pump mode in response to a fourth operating mode.

In accordance with yet another embodiment, a battery charging system comprises a switched capacitor converter comprising a plurality of first power switches connected in series between a first voltage bus and ground, and a first flying capacitor, wherein and the first voltage bus is coupled to a battery through a switch and coupled to an output of a wireless charging path and an output of a high voltage direct charging path, a hybrid converter comprising a plurality of second power switches connected in series between the first voltage bus and ground, an inductor and a second flying capacitor, wherein the inductor is connected to a midpoint of the plurality of second power switches and coupled to an output of a universal serial bus (USB), and an isolation switch coupled between the midpoint of the plurality of second power switches and a midpoint of the plurality of first power switches.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a single-stage battery charging system for charging a dual-cell battery. The invention may also be applied, however, to a variety of power systems. Hereinafter, various embodiments will be explained in detail with reference to the accompanying drawings.

Figure 3:
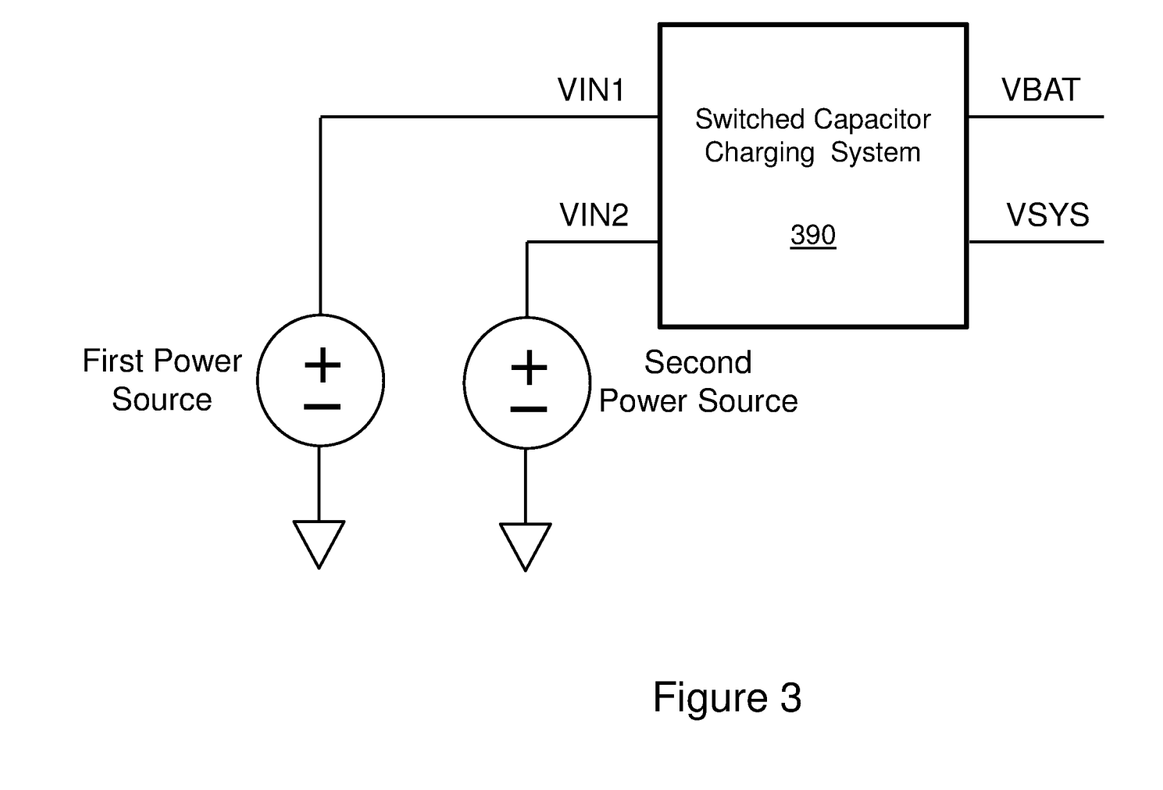
FIG. 3 illustrates a block diagram of a single-stage battery charging system in accordance with various embodiments of the present disclosure.

FIG. 3 illustrates a block diagram of a single-stage battery charging system in accordance with various embodiments of the present disclosure. The single-stage battery charging system 390 has four input/output terminals, namely VIN1, VIN2, VBAT and VSYS as shown in FIG. 3. In some embodiments, VIN1 is configured to be connected with a first power source. VIN2 is configured to be connected with a second power source. VBAT is configured to be coupled with a dual-cell battery through a switch. VSYS is a system voltage bus configured to provide power for a plurality of system loads of a portable device (e.g., a smart phone).

In some embodiments, VIN1 is configured to be connected with a power source having an adjustable output voltage in a range from 6 V to 10 V with a predetermined voltage step, such as a 20-mV step provided by a USB PD3.0 PPS adaptor.

In some embodiments, VIN2 is configured to be connected with a power source. The power source may have a fixed output voltage (e.g., 5 V). Alternatively, the power source has an adjustable output voltage (e.g., from 3.6 V to 5.5 V) with a predetermined voltage step. For example, the power source may be a USB PD3.0 PPS adaptor with a 20-mV step.

In some embodiments, VBAT is connected to a dual-cell battery through a switch. The switch may be configured as a linear charger in some embodiments. VSYS is connected to the system supply that requires a certain voltage range. For example, a smartphone system requires a system supply voltage in a range from 3.5 V to 4.5 V.

The single-stage battery charging system 390 can take either a single input (one of VIN1 and VIN2) or two inputs (both VIN1 and VIN2). For a single input, the single-stage battery charging system 390 is able to generate two outputs. For two inputs, the single-stage battery charging system 390 is able to generate two outputs. It should be noted that when both inputs are present, the voltage of VIN1 should be adjustable to a voltage level equal to twice the battery voltage plus the overhead for the linear regulator coupled between VIN1 and VBAT. In addition, the voltage of VIN2 must be less than the voltage of VIN1 by a predetermined value to take advantages of having two input power sources.

The single-stage battery charging system 390 includes a hybrid converter, a switched capacitor converter and an isolation switch. The hybrid converter comprises a plurality of first power switches connected in series between VIN1 and ground, an inductor and a first flying capacitor. The inductor is coupled between a midpoint of the plurality of first power switches and VIN2.

The switched capacitor converter comprises a plurality of second power switches connected in series between VIN1 and ground, and a second flying capacitor. The isolation switch is coupled between the midpoint of the plurality of first power switches and a midpoint of the plurality of second power switches. The single-stage battery charging system 390 can be used to replace the dual-stage battery charging system shown in FIGS. 1-2. The detailed implementations of the single-stage battery charging system 390 will be described below with respect to FIGS. 4-5.

In operation, depending on different applications and design needs, the switched capacitor converter is configured as an open-loop converter operating either in a 2:1 charge pump mode or a 1:2 charge pump mode. Depending on different applications and design needs, the hybrid converter can be configured as a three-level boost converter, a three-level buck converter or a switched capacitor converter.

In operation, when the single-stage battery charging system 390 operates in a battery mode only, both the hybrid converter and the switched capacitor converter operate in a 2:1 charge pump mode with the isolation switch being turned on to supply the system voltage at VSYS.

In operation, when the On-The-Go (OTG) operation is requested, the system supply (VSYS) is provided by the switched capacitor converter. The OTG voltage is supplied by the hybrid converter. Under this operation, the isolation switch is turned off and the hybrid converter operates in a three-level buck mode (configured as a three-level buck converter) to provide an OTG voltage (e.g., 5.1 V).

The detailed schematic diagram and operating principle of the single-stage battery charging system shown in FIG. 3 will be described below with respect to FIGS. 4-5.

Figure 4:
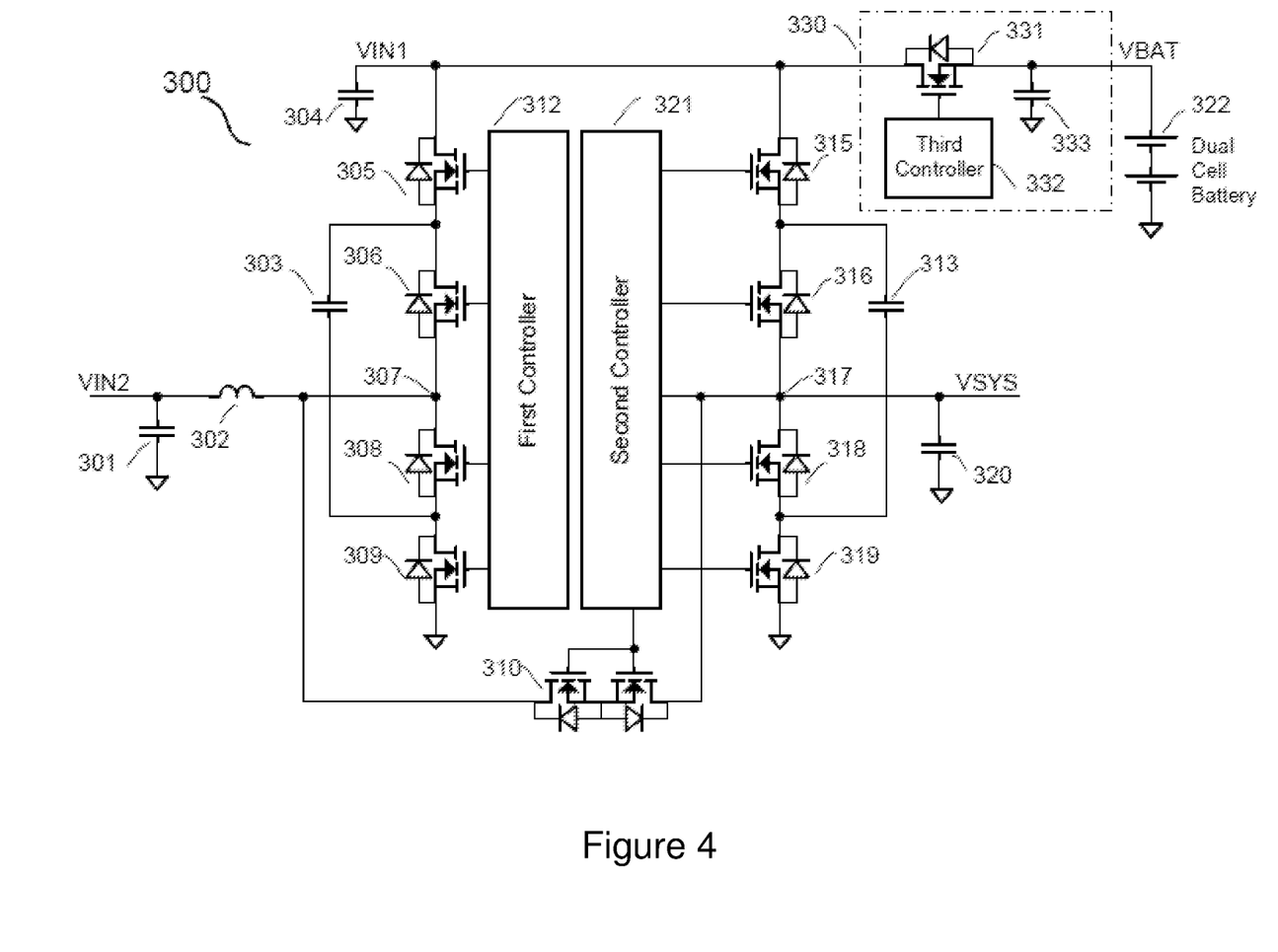
FIG. 4 illustrates a schematic diagram of the single-stage battery charging system shown in FIG. 3 in accordance with various embodiments of the present disclosure.

FIG. 4 illustrates a schematic diagram of the single-stage battery charging system shown in FIG. 3 in accordance with various embodiments of the present disclosure. The single-stage battery charging system 300 comprises four voltage buses, namely VIN1, VIN2, VBAT and VSYS. In some embodiments, the first voltage bus VIN1 is configured to be coupled to a first voltage source. As shown in FIG. 4, the first voltage bus VIN1 is coupled to a dual-cell battery 322 through a switch 331. The second voltage bus VIN2 is configured to be coupled to a second voltage source. The third voltage bus VSYS is coupled to a system voltage bus.

As shown in FIG. 4, switches 315, 316, 318, and 319, a flying capacitor 313 and filtering capacitors 320 and 304 form a single-phase switched capacitor converter. Throughout the description, the single-phase switched capacitor converter is alternatively referred to as a switched capacitor converter. As shown in FIG. 4, switches 305, 306, 308, 309, a flying capacitor 303, the filtering capacitor 304, an inductor 302 and a filtering capacitor 301 form a hybrid converter.

The hybrid converter comprises a first switch 305, a second switch 306, a third switch 308 and a fourth switch 309 connected in series between the first voltage bus VIN1 and ground. The first flying capacitor 303 is connected between a common node of the first switch 305 and the second switch 306, and a common node of the third switch 308 and the fourth switch 309. The inductor 302 is connected between a common node 307 of the second switch 306 and the third switch 308, and the second voltage bus VIN2. Throughout the description, the common node 307 may be alternatively referred to as a midpoint of a plurality of power switches including switches 305, 306, 308 and 309.

The switched capacitor converter comprises a fifth switch 315, a sixth switch 316, a seventh switch 318 and an eighth switch 319 connected in series between the first voltage bus VIN1 and ground. The second flying capacitor 313 is connected between a common node of the fifth switch 315 and the sixth switch 316, and a common node of the seventh switch 318 and the eighth switch 319. A common node 317 of the sixth switch 316 and the seventh switch 318 is connected to VSYS. Throughout the description, the common node 317 may be alternatively referred to as a midpoint of a plurality of power switches including switches 315, 316, 318 and 319.

The isolation switch 310 is coupled between the midpoint 307 and the midpoint 317. As shown in FIG. 4, the isolation switch 310 comprises two back-to-back connected transistors.

A first controller 312 is configured to generate gate drive signals for driving switches 305, 306, 308 and 309. A second control 321 is configured to generate gate drive signals for driving switches 315, 316, 318 and 319, and the isolation switch 310. In some operating modes, the first controller 312 can be configured as a switched capacitor charger controller. In alternative operating modes, the first controller 312 can be configured as a three-level switching charger controller.

In accordance with an embodiment, the switches of FIG. 4 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 4 shows the switches (e.g., switch 305) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 4 may be implemented as a plurality of switches connected in parallel. Moreover, a capacitor may be connected in parallel with one switch to achieve zero voltage switching (ZVS)/zero current switching (ZCS).

In operation, after the isolation switch 310 has been turned on, the hybrid converter and the switched capacitor converter may form a dual-phase switched capacitor converter. The dual-phase switched capacitor converter may operate in either a 2:1 charge pump mode or a 1:2 charge pump mode. When the isolation switch 310 is turned off, the hybrid converter can be configured as a three-level boost converter, a three-level buck converter or a switched capacitor converter. The switched capacitor converter can be configured as a single-phase switched capacitor converter configured to operate in either a 2:1 charge pump mode or a 1:2 charge pump mode. In particular, when VBAT is configured as an input, and VSYS is configured as an output, the switched capacitor converter is configured to operate in the 2:1 charge pump mode. On the other hand, when VSYS is configured as an input, and VBAT is configured as an output, the switched capacitor converter is configured to operate in the 1:2 charge pump mode.

In operation, when the isolation switch 310 is turned on, the first controller 312 and the second controller 321 are configured such that the gate drive signals of the hybrid converter and the gate drive signals of the switched capacitor converter are synchronized to each other. The hybrid converter and the switched capacitor converter operate at a same frequency. In particular, these two converters can sync up to operate at the same frequency with 180 degrees out of phase. The hybrid converter and the switched capacitor converter form a dual-phase switched capacitor converter. Alternatively, depending on design needs, these two converters are in phase with each other.

The circuit 330 functions as a linear regulator. As shown in FIG. 4, the circuit 330 comprises a switch 331, a third controller 332 and an output capacitor 333. The third controller 332 can regulate the pre-charging current to charge the dual-cell battery 322 when the dual-cell battery 322 is in a pre-charging state. In the pre-charging state, the switch 331 operates in a saturation state. The switch 331 functions as a constant current source. When the dual-cell battery 322 enters the constant current mode, the third controller 332 is configured such that the switch 331 operates in the linear mode to minimum the power loss on the switch 331. The current flowing through the switch 331 is monitored by the third controller 332 for over-current protection purposes. When the dual-cell battery 322 enters the constant voltage mode, the voltage at VBAT is closely regulated by the third controller 332 in a fast manner while the first controllers 312 is configured to regulate the voltage at VIN2 in a slow manner by adjusting the input voltage at either VIN1 or VIN2 through the USB fast charging protocols to minimize the headroom of the switch 331, thereby minimizing the power dissipation at the switch 331.

In some embodiments, only one input voltage source is coupled to the single-stage battery charging system 300. In particular, the input voltage source is connected to the second input VIN2 only. The input voltage source has a fixed output voltage (e.g., 5 V). In response to this system configuration, the hybrid converter is configured as a three-level boost converter converting the input voltage into an output voltage twice the system voltage. The switched capacitor converter is configured as a 2:1 power converter to provide power for the system voltage bus VSYS. When the dual-cell battery is not in the pre-charging state, the voltage on VIN1 is equal to the battery voltage plus the minimum headroom of the linear regulator 330. On the other hand, when the battery is in the pre-charging state, the voltage on VIN1 is twice the minimum voltage of VSYS.

In some embodiments, only one input voltage source is coupled to the single-stage battery charging system 300. In particular, the input voltage source is connected to the second input VIN2 only. The input voltage source has an adjustable output voltage. The voltage on VSYS is within the range in which the input voltage can be adjusted. In response to this system configuration, the isolation switch 310 is turned on. The output voltage of the input voltage source (VIN2) is adjusted to a level equal to the required system voltage on VSYS. The required system voltage is half of the battery voltage if the dual-cell battery is not in the pre-charging mode. The required system voltage is equal to the minimum system voltage if the dual-cell battery is in the pre-charging mode. The hybrid converter, the switched capacitor converter and the isolation switch form a dual-phase switched capacitor converter operating in a 1:2 charge pump mode to provide power for the dual-cell battery.

In some embodiments, only one input voltage source is coupled to the single-stage battery charging system 300. In particular, the input voltage source is connected to the first input VIN1 only. The input voltage source has an adjustable output voltage. In response to this system configuration, the isolation switch 310 is turned on. The hybrid converter, the switched capacitor converter and the isolation switch form a dual-phase switched capacitor converter. The dual-phase switched capacitor converter operates in a 2:1 charge pump mode to provide power for the system voltage (VSYS).

In some embodiments, the input voltage source (VIN1) can be adjusted to a level lower than twice the minimum system voltage, and the dual-cell battery is in the pre-charging state. In response to this system configuration, the output voltage of the input voltage source can be adjusted to be slightly higher than the battery voltage so as to minimize the power dissipation in the linear charger 330 during the pre-charge state of the battery. In addition, only the hybrid converter is enabled. The isolation switch 310 is turned on. The hybrid converter operates in a three-level buck mode to supply the minimum system voltage at VSYS through the isolation switch 310. The switched capacitor converter is kept off. Once the battery voltage reaches a level twice the minimum system voltage, the switched capacitor converter is enabled. The hybrid converter, the switched capacitor converter and the isolation switch form a dual-phase switched capacitor converter. The dual-phase switched capacitor converter operates in a 2:1 charge pump mode to provide power for the system voltage (VSYS).

In some embodiments, two input voltage sources are coupled to the single-stage battery charging system 300. A first input voltage source is connected to VIN1. A second input voltage source is connected to VIN2. The single-stage battery charging system 300 may operate in four different operating modes.

In the first operating mode, an output voltage of the first power source (the input voltage at VIN1) is adjustable in a range covering the battery voltage range. An output voltage of the second power source (the input voltage at VIN2) is adjusted to a voltage level equal to a system supply voltage on the system voltage bus VSYS during the whole charging process of the dual-cell battery. The isolation switch 310 is turned on. The hybrid converter, the switched capacitor converter and the isolation switch 310 form a dual-phase switched capacitor converter to provide power for the dual-cell battery.

In the second operating mode, an output voltage of the first power source (the input voltage at VIN1) is adjustable. The range of the input voltage at VIN1 covers a range equal to twice the required system voltage range at VSYS. An output voltage of the second power source (the input voltage at VIN2) is a fixed voltage (e.g., 5 V). The isolation switch 310 is turned off. The hybrid converter is configured as a three-level boost converter to provide power for the dual-cell battery and the switched capacitor converter. The switched capacitor converter operates in a 2:1 charge pump mode to supply the system voltage on VSYS.

In the third operating mode, an output voltage of the first power source is adjustable. The adjustable output voltage of the first power source (the input voltage at VIN1) cannot cover the whole battery voltage range. An output voltage of the second power source (the input voltage at VIN2) is adjustable in a range covering the required system voltage range. The isolation switch 310 is turned on. The hybrid converter, the switched capacitor converter and the isolation switch form a dual-phase switched capacitor converter operating in a 2:1 charge pump mode before a maximum voltage of the first voltage source is less than twice a required system voltage, and after the maximum voltage of the first voltage source is less than twice a required system voltage, the isolation switch 310 is turned off. The hybrid converter is configured as a three-level boost converter to supply the power to VIN1. The switched capacitor converter continuously operates in a 2:1 charge pump mode to supply the system voltage at VSYS. The first power source is disconnected from VIN1.

In the fourth operating mode, an output voltage of the first power source is adjustable. The adjustable supply voltage source at VIN1 cannot cover the battery voltage range and an output voltage of the second power source (the input voltage at VIN2) is a fixed voltage (e.g., 5 V). The isolation switch 310 is turned off. The hybrid converter is configured as a three-level boost converter. The switched capacitor converter operates in 2:1 charge pump mode to supply the system voltage at VSYS. The output voltage of the first power source (the input voltage at VIN1) is adjusted to a voltage level equal to twice the required system voltage until the first power source reaches its maximum voltage. The first power source is disconnected from VIN1 after the first power source reaches its maximum voltage. After the first power source has been disconnected from VIN1, the second power source continues to charge the dual-cell battery.

In operation, when the single-stage battery charging system 300 operates in the battery mode, the isolation switch 310 is turned on. The hybrid converter, the switched capacitor converter and the isolation switch form a dual-phase switched capacitor converter to supply the system voltage at VSYS. The system voltage on the system voltage bus is equal to one half of a voltage across the dual-cell battery. In this system configuration, the inductor 302 does not generate power dissipation.

In operation, in response to an On-The-Go (OTG) mode, the isolation switch 310 is turned off. The hybrid converter is configured as a three-level buck converter to provide an OTG voltage (e.g., 5.1 V OTG). The switched capacitor converter is configured to operate in a 2:1 charge pump mode to provide power for the system voltage bus VSYS.

Under a battery operation only situation, the switch 331 of the linear charger 330 is driven to operate in a linear mode to minimize unnecessary power dissipation. It should be noted that the current flowing through the switch 331 is equal to one half of the current flowing through the switch 118 shown in FIG. 1. As such, the power dissipation in the switch 331 is one quarter of the power dissipation in the switch 118. The reduced power dissipation helps to minimize unnecessary power losses so as to extend the battery operating time.

In operation, the single-stage battery charging system 300 may operate in the battery shipping mode. The battery shipping mode can be achieved by turning off switches 305 and 315. In the battery shipping mode, the second controller 321 is powered by the dual-cell battery 322 with minimal current consumption. When the USB input, the wireless input, or an I/O logic signal is applied to the second controller 321, the single-stage battery charging system 300 exits from the shipping mode.

In operation, the single-stage battery charging system 300 may operate in a system reset mode. The system reset mode is a process to discharge VSYS to zero volts. VSYS stays at zero volts for a predetermined time and then, the single-stage battery charging system 300 reestablishes VSYS using a soft start process. The system reset mode can be obtained by turning off switches 305, 315, 310 and discharging VSYS. Once the predetermined time expires, the voltage on VSYS can be reestablished by the soft start process.

In operation, the node 307 may function as an input, and VSYS may function as an output. The linear charger 330 is not in use. In this system configuration, the isolation switch 310 and the seventh switch 318 are configured to be turned off. Switches 315, 316 and 319 are configured to be turned on. The hybrid converter is configured to operate in a 1:2 charge pump mode. The system supply voltage on VSYS is equal to twice an output voltage of the voltage source coupled to the node 307. Alternatively, the isolation switch 310 and the third switch 308 are configured to be turned off. Switches 305, 306 and 309 are configured to be turned on. The switched capacitor converter is configured to operate in a 2:1 charge pump mode. The system supply voltage on VSYS is equal to one half of an output voltage of the voltage source coupled to the node 307.

Figure 5:
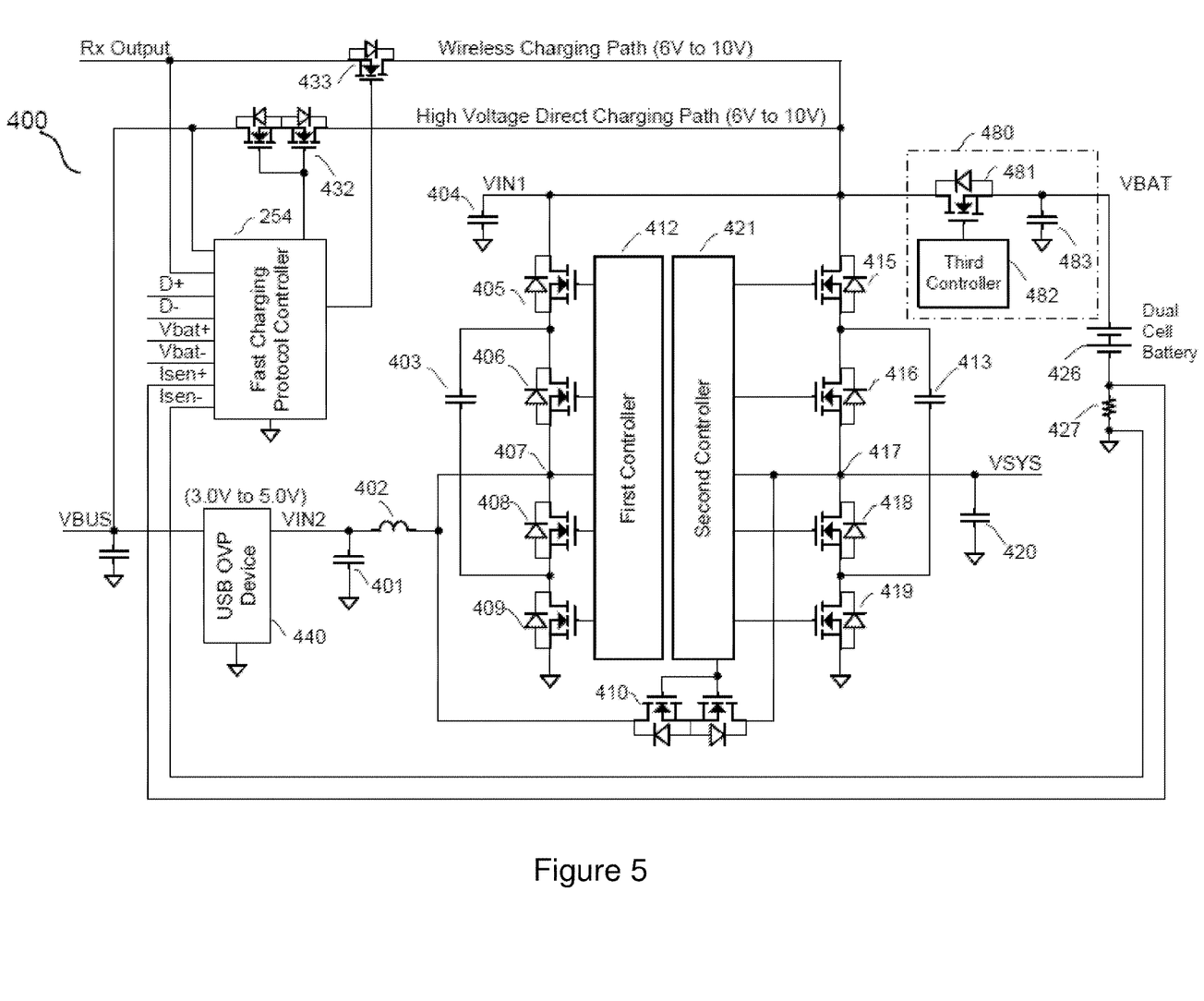
FIG. 5 illustrates a system diagram of a first implementation of the single-stage battery charging system shown in FIG. 4 in accordance with various embodiments of the present disclosure.

FIG. 5 illustrates a system diagram of a first implementation of the single-stage battery charging system shown in FIG. 4 in accordance with various embodiments of the present disclosure. The hybrid converter, the switched capacitor converter and the isolation switch in FIG. 5 is similar to those shown in FIG. 4, and hence are not discussed in further detail.

The single-stage battery charging system 400 has two types of the input sources, namely a USB input and a wireless input. An over voltage protection (OVP) device 440 is used to disconnect the USB input source from the single-stage battery charging system 400 if there is a large surge voltage present at the VBUS terminal or the wireless input is selected. The switch 432 comprises two back-to-back connected transistors. The switch 432 can enable the power source from the USB to be applied to VIN1 input directly without passing the OVP device 440 and the inductor 402 to achieve better charging efficiency. The circuit 480 functions as a linear regulator. As shown in FIG. 5, the circuit 480 comprises a switch 481, a linear regulator controller 482 and an output capacitor 483. The circuit 480 is similar to the circuit 330 shown in FIG. 4, and hence is not discussed in detail herein. One advantageous feature of having this linear regulator (e.g., circuit 480) is the linear regulator (e.g., linear charger 261 shown in FIG. 2) in the wireless power transfer system can be saved, thereby reducing the system cost.

The power switch 433 enables the wireless input to be connected or disconnected at VIN1. The control unit 254 is a fast charging protocol controller. The control unit 254 is able to detect the input power source as well as the USB adaptor type to decide which input (VIN1 and VIN2) the USB input should be applied to. The USB adaptors are BC1.2, DCP, as well as other adjustable voltage fast charge travel adaptors. When the adaptors applied to VBUS have an adjustable output voltage from 3.6 V to 5.5 V with a 20-mV step or a fixed voltage (e.g., 5 V), the OVP device 440 is turned on and the single-stage battery charging system 400 is powered up from VIN2 as shown in FIG. 5. If the adaptors applied to VBUS have an adjustable voltage from 5 V to 10 V with a 20-mV step, the power switch 432 is turned on and the single-stage battery charging system 400 is powered up from VIN1. When a wireless power transfer system is detected and its output voltage is adjustable from 5 V to 10 V with a 20-mV step, the single-stage battery charging system 400 is powered up from VIN1. When both the wireless charging and the USB adaptors are present, the single-stage battery charging system 400 can be powered up from both the USB adaptor and the wireless charging receiver. For example, the USB adaptor may provide a fixed voltage (e.g., 5 V), which is applied to the single-stage battery charging system 400 through USB OVP device 440. The adjustable wireless output voltage is applied to the single-stage battery charging system 400 through power switch 433.

Figure 6:
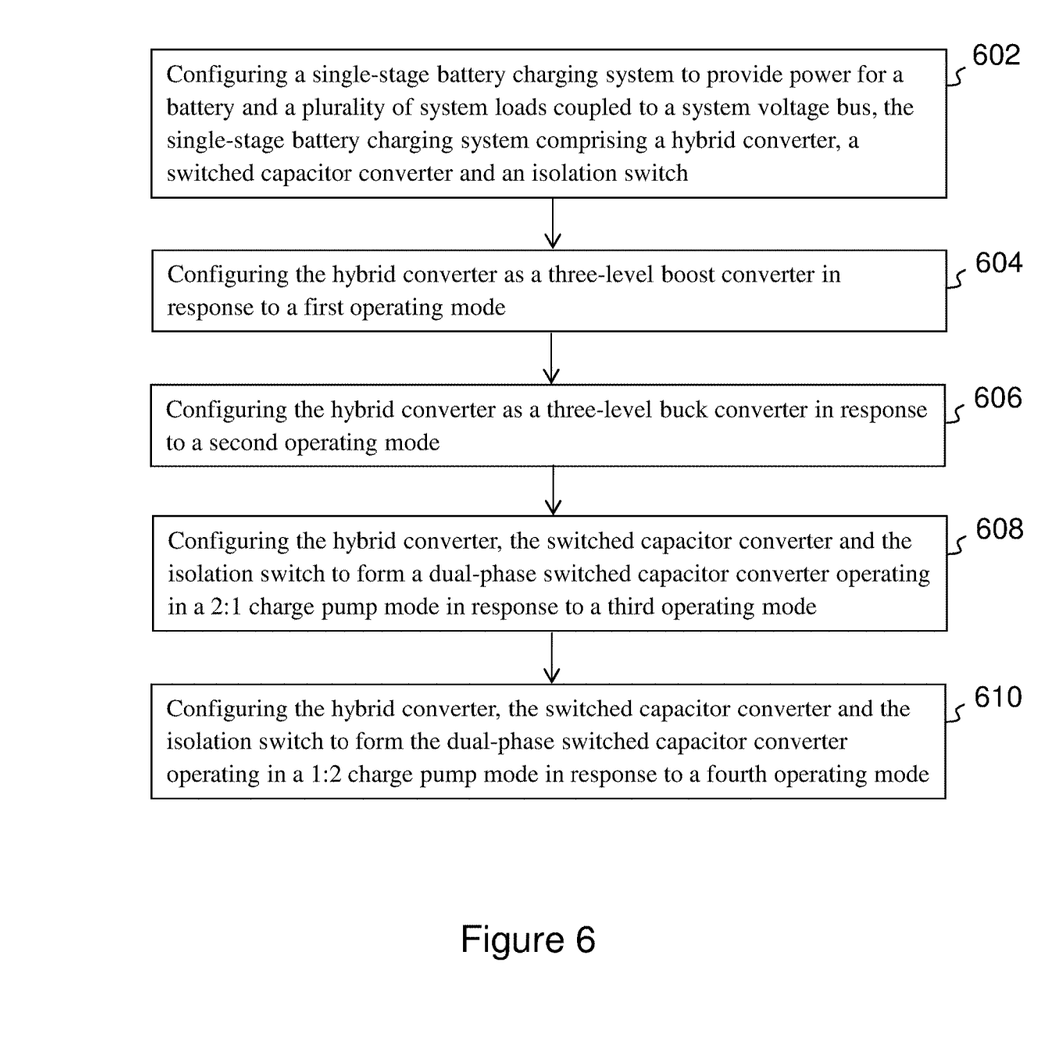
FIG. 6 illustrates a flow chart of a control method for the single-stage battery charger systems shown in FIGS. 3-5 in accordance with various embodiments of the present disclosure.

FIG. 6 illustrates a flow chart of a control method for the single-stage battery charger systems shown in FIGS. 3-5 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

The single-stage battery charger system comprises a hybrid converter, a switched capacitor converter and an isolation switch. The hybrid converter comprises a plurality of first power switches connected in series, an inductor and a first flying capacitor. The inductor is connected to a midpoint of the plurality of first power switches. The switched capacitor converter comprises a plurality of second power switches connected in series and a second flying capacitor. The isolation switch is coupled between the midpoint of the plurality of first power switches and a midpoint of the plurality of second power switches.

The single-stage battery charger system comprises four input/output terminals. A first input/output terminal is coupled to a first power source. Referring back to FIG. 5, the first power source may be from a wireless charging path. Alternatively, the first power source may be from a high voltage direct charging path. A second input/output terminal is coupled to a second power source. Referring back to FIG. 5, the second power source may be from a USB adaptor. In some embodiments, the USB adaptor has a fixed voltage (e.g., 5 V). Alternatively, the USB adaptor has an adjustable voltage (e.g., from 3 V to 5 V). A third input/output terminal is coupled to a dual-cell battery. A linear charger is connected between the first input/output terminal and the third input/output terminal. A fourth input/output terminal is coupled to a system voltage bus configured to provide supply power for various loads.

At step 602, the single-stage battery charging system is configured to provide power for a battery and a plurality of system loads coupled to a system voltage bus. The single-stage battery charging system comprises the hybrid converter, the switched capacitor converter and the isolation switch.

At step 604, the hybrid converter is configured as a three-level boost converter in response to a first operating mode. In the first operating mode, a power source having a fixed output voltage is connected to the second input/output terminal only. The hybrid converter is configured as the three-level boost converter to provide power for the dual-cell battery and a plurality of system loads.

At step 606, the hybrid converter is configured as a three-level buck converter in response to a second operating mode. In the second operating mode, after receiving an OTG request, the hybrid converter is configured as the three-level buck converter to provide an OTG voltage.

At step 608, the hybrid converter, the switched capacitor converter and the isolation switch are configured to form a dual-phase switched capacitor converter operating in a 2:1 charge pump mode in response to a third operating mode.

In the third operating mode, a single power source having an adjustable output voltage is coupled to the first input/output terminal only. The hybrid converter, the switched capacitor converter and the isolation switch form the dual-phase switched capacitor converter configured to operate in the 2:1 charge pump mode to provide power for the system voltage bus.

At step 610, the hybrid converter, the switched capacitor converter and the isolation switch are configured to form the dual-phase switched capacitor converter operating in a 1:2 charge pump mode in response to a fourth operating mode.

In the fourth operating mode, a single power source having an adjustable output voltage is coupled to the second input/output terminal only. The hybrid converter, the switched capacitor converter and the isolation switch form the dual-phase switched capacitor converter configured to operate in the 1:2 charge pump mode to provide power for the dual-cell battery.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A single-stage battery charging system comprising:
a hybrid converter comprising a plurality of first power switches connected in series, an inductor and a first flying capacitor, wherein the inductor is connected to a midpoint of the plurality of first power switches;
a switched capacitor converter comprising a plurality of second power switches connected in series, and a second flying capacitor; and
an isolation switch comprising two back-to-back connected transistors, wherein the isolation switch is directly coupled to the inductor and the midpoint of the plurality of first power switches, and coupled to a midpoint of the plurality of second power switches.

2. The single-stage battery charging system of claim 1, wherein:
the hybrid converter comprises:
a first switch, a second switch, a third switch and a fourth switch connected in series between a first voltage bus and ground;
the first flying capacitor connected between a common node of the first switch and the second switch, and a common node of the third switch and the fourth switch; and
the inductor connected between a common node of the second switch and the third switch, and a second voltage bus, wherein the midpoint of the plurality of first power switches is the common node of the second switch and the third switch; and
the switched capacitor converter comprises:
a fifth switch, a sixth switch, a seventh switch and an eighth switch connected in series between the first voltage bus and the ground, and wherein the midpoint of the plurality of second power switches is a common node of the sixth switch and the seventh switch, the midpoint of the plurality of second power switches being connected to a system voltage bus; and
the second flying capacitor connected between a common node of the fifth switch and the sixth switch, and a common node of the seventh switch and the eighth switch.

3. The single-stage battery charging system of claim 2, wherein:
the first voltage bus is configured to be coupled to a first voltage source;
the first voltage bus is coupled to a dual-cell battery through a switch; and
the second voltage bus is configured to be coupled to a second voltage source.

4. The single-stage battery charging system of claim 3, wherein:

in a pre-charge mode of the dual-cell battery, the switch is configured as a current source to provide power for the dual-cell battery;

in a constant current charging mode of the dual-cell battery, the switch is configured to operate in a linear mode to reduce power losses; and in a constant voltage charging mode of the dual-cell battery, the switch is configured as a linear regulator, and wherein an output voltage of the linear regulator is closely regulated in a fast manner, and an input voltage of the linear regulator is regulated in a slow manner to reduce power dissipation in the linear regulator.

5. The single-stage battery charging system of claim 3, wherein:

in response to a single power source having a fixed output voltage coupled to the second voltage bus, the isolation switch is turned off, and wherein:

the hybrid converter is configured as a three-level boost converter; and the switched capacitor converter is configured to operate in a 2:1 charge pump mode to provide power to the system voltage bus.

6. The single-stage battery charging system of claim 3, wherein:

in response to a single power source having an adjustable output voltage coupled to the second voltage bus, the isolation switch is turned on, and wherein the hybrid converter, the switched capacitor converter and the isolation switch form a dual-phase switched capacitor converter configured to operate in a 1:2 charge pump mode.

7. The single-stage battery charging system of claim 3, wherein:

in response to a single power source having an adjustable output voltage coupled to the first voltage bus, the isolation switch is turned on, and wherein the hybrid converter, the switched capacitor converter and the isolation switch form a dual-phase switched capacitor converter configured to operate in a 2:1 charge pump mode.

8. The single-stage battery charging system of claim 3, wherein:

in response to a single power source coupled to the first voltage bus, the single power source having an adjustable output voltage lower than twice a minimum system voltage and the dual-cell battery operating in a pre-charge mode, the isolation switch is turned on, and wherein:

the switch is configured as a linear regulator configured to charge the dual-cell battery;

to reduce power dissipation in the linear regulator, the adjustable output voltage of the single power source is adjusted to a level equal to a voltage across the dual-cell battery plus a predetermined voltage;

the hybrid converter is configured as a three-level buck converter to provide power to the system voltage bus through the isolation switch; and the switched capacitor converter is kept off.

9. The single-stage battery charging system of claim 3, wherein:

in response to a first power source coupled to the first voltage bus and a second power source coupled to the second voltage bus, an output voltage of the first power source being adjusted to cover a voltage range of the dual-cell battery, and an output voltage of the second power source being adjusted to a voltage level equal to a system supply voltage on the system voltage bus, the isolation switch is turned on, and wherein the hybrid converter, the switched capacitor converter and the isolation switch form a dual-phase switched capacitor converter.

10. The single-stage battery charging system of claim 3, wherein:

in response to a first power source coupled to the first voltage bus and a second power source coupled to the second voltage bus, an output voltage of the first power source being adjusted to a voltage level equal to twice a system supply voltage on the system voltage bus, and an output voltage of the second power source is a fixed voltage, the isolation switch is turned off, and wherein:

the hybrid converter is configured as a three-level boost converter to provide power for the dual-cell battery and the switched capacitor converter; and the switched capacitor converter is configured to operate in a 2:1 charge pump mode to provide power for the system voltage bus.

11. The single-stage battery charging system of claim 3, wherein:

in response to a first power source coupled to the first voltage bus and a second power source coupled to the second voltage bus, an output voltage of the first power source being adjusted, and an output voltage of the second power source is an adjustable voltage covering a required system voltage range, the isolation switch is turned on, and wherein:

the hybrid converter, the switched capacitor converter and the isolation switch form a dual-phase switched capacitor converter before a maximum voltage of the first voltage source is less than twice a required system voltage; and after the maximum voltage of the first voltage source is less than twice the required system voltage, the isolation switch is turned off, the hybrid converter is configured as a three-level boost converter, the switched capacitor converter is configured to operate in a 2:1 charge pump mode, and the first power source is disconnected from the first voltage bus.

12. The single-stage battery charging system of claim 3, wherein:

in response to a first power source coupled to the first voltage bus and a second power source coupled to the second voltage bus, an output voltage of the first power source being adjusted, and an output voltage of the second power source is a fixed voltage, the isolation switch is turned off, and wherein:

the hybrid converter is configured as a three-level boost converter;

the switched capacitor converter is configured to operate in a 2:1 charge pump mode; and the output voltage of the first power source is adjusted to a voltage level equal to twice a required system voltage until the first power source reaches a maximum voltage of the first power source, and the first power source is disconnected from the first voltage bus after the first power source reaches the maximum voltage of the first power source.

13. The single-stage battery charging system of claim 3, wherein:

in response to a battery mode, the isolation switch is turned on, and wherein the hybrid converter, the switched capacitor converter and the isolation switch form a dual-phase switched capacitor converter, and wherein a system voltage on the system voltage bus is equal to one half of a voltage across the dual-cell battery.

14. The single-stage battery charging system of claim 3, wherein:
in response to an On-The-Go (OTG) mode, the isolation switch is turned off, and wherein:
the hybrid converter is configured as a three-level buck converter to provide an OTG voltage; and
the switched capacitor converter is configured to operate in a 2:1 charge pump mode to provide power for the system voltage bus.

15. The single-stage battery charging system of claim 3, wherein:
in response to a shipping mode, the first switch and the fifth switch are configured to be turned off.

16. The single-stage battery charging system of claim 3, wherein:
in response to a system reset mode, the first switch and the fifth switch are configured to be turned off and the system voltage bus is discharged to zero volts.

17. The single-stage battery charging system of claim 3, wherein:
in response to a voltage source connected to the common node of the second switch and the third switch, the isolation switch and the seventh switch are configured to be turned off, and wherein:
the hybrid converter is configured to operate in a 1:2 charge pump mode; and
a system supply voltage on the system voltage bus is equal to twice an output voltage of the voltage source.

18. The single-stage battery charging system of claim 3, wherein:
in response to a voltage source connected to the common node of the second switch and the third switch, the isolation switch and the third switch are configured to be turned off, and wherein:
the switched capacitor converter is configured to operate in a 2:1 charge pump mode; and
a system supply voltage on the system voltage bus is equal to one half of an output voltage of the voltage source.

19. A method comprising:
configuring a single-stage battery charging system to provide power for a battery and a plurality of system loads coupled to a system voltage bus, the single-stage battery charging system comprising a hybrid converter, a switched capacitor converter and an isolation switch;
configuring the hybrid converter as a three-level boost converter in response to a first operating mode;
configuring the hybrid converter as a three-level buck converter in response to a second operating mode;
configuring the hybrid converter, the switched capacitor converter and the isolation switch to form a dual-phase switched capacitor converter operating in a 2:1 charge pump mode in response to a third operating mode; and
configuring the hybrid converter, the switched capacitor converter and the isolation switch to form the dual-phase switched capacitor converter operating in a 1:2 charge pump mode in response to a fourth operating mode.

20. The method of claim 19, wherein:
the hybrid converter comprises:
a first switch, a second switch, a third switch and a fourth switch connected in series between a first voltage bus and ground;

a first flying capacitor connected between a common node of the first switch and the second switch, and a common node of the third switch and the fourth switch; and
an inductor connected between a common node of the second switch and the third switch, and a second voltage bus;
the switched capacitor converter comprises:
a fifth switch, a sixth switch, a seventh switch and an eighth switch connected in series between the first voltage bus and the ground, and wherein a common node of the sixth switch and the seventh switch is connected to a third voltage bus; and
a second flying capacitor connected between a common node of the fifth switch and the sixth switch, and a common node of the seventh switch and the eighth switch;
the first voltage bus is configured to be coupled to a first voltage source;
the first voltage bus is coupled to a dual-cell battery through a switch;
the second voltage bus is configured to be coupled to a second voltage source; and
the third voltage bus is coupled to the system voltage bus.

21. The method of claim 20, wherein:
in the first operating mode, a power source having a fixed output voltage is connected to the second voltage bus, and the hybrid converter is configured as the three-level boost converter to provide power for the dual-cell battery.

22. The method of claim 20, wherein:
in the second operating mode, after receiving an OTG request, the hybrid converter is configured as the three-level buck converter to provide an OTG voltage.

23. The method of claim 20, wherein:
in the third operating mode, a single power source having an adjustable output voltage is coupled to the first voltage bus, and wherein the hybrid converter, the switched capacitor converter and the isolation switch form the dual-phase switched capacitor converter configured to operate in the 2:1 charge pump mode to provide power for the system voltage bus.

24. The method of claim 20, wherein:
in the fourth operating mode, a single power source having an adjustable output voltage is coupled to the second voltage bus, and wherein the hybrid converter, the switched capacitor converter and the isolation switch form the dual-phase switched capacitor converter configured to operate in the 1:2 charge pump mode to provide power for the dual-cell battery.

25. A battery charging system comprising:
a switched capacitor converter comprising a plurality of first power switches connected in series between a first voltage bus and ground, and a first flying capacitor, wherein and the first voltage bus is coupled to a battery through a switch and coupled to an output of a wireless charging path and an output of a high voltage direct charging path;
a hybrid converter comprising a plurality of second power switches connected in series between the first voltage bus and the ground, an inductor and a second flying capacitor, wherein the inductor is connected to a midpoint of the plurality of second power switches and coupled to an output of a universal serial bus (USB); and
an isolation switch comprising two back-to-back connected transistors, wherein the isolation switch is directly coupled to the inductor and the midpoint of the plurality of second power switches, and coupled to a midpoint of the plurality of first power switches.

26. The battery charging system of claim 25, wherein:

the hybrid converter comprises:
- a first switch, a second switch, a third switch and a fourth switch connected in series between the first voltage bus and the ground;
- the second flying capacitor connected between a common node of the first switch and the second switch, and a common node of the third switch and the fourth switch; and
- the inductor is connected between a common node of the second switch and the third switch, and a second voltage bus, wherein the midpoint of the plurality of second power switches is the common node of the second switch and the third switch;

the switched capacitor converter comprises:
- a fifth switch, a sixth switch, a seventh switch and an eighth switch connected in series between the first voltage bus and ground, and wherein the midpoint of the plurality of first power switches is a common node of the sixth switch and the seventh switch, the midpoint of the plurality of first power switches being connected to a third voltage bus; and
- the second flying capacitor connected between a common node of the fifth switch and the sixth switch, and a common node of the seventh switch and the eighth switch; and the third voltage bus is coupled to a system voltage bus.

* * * * *